(12) United States Patent
Jarvis

(10) Patent No.: US 10,793,087 B2
(45) Date of Patent: Oct. 6, 2020

(54) TRUCK BED CONTAINER

(71) Applicant: Kenneth D Jarvis, Cypress, TX (US)

(72) Inventor: Darrell Jarvis, Tomball, TX (US)

(*) Notice: Subject to any disclaimer, the term of this patent is extended or adjusted under 35 U.S.C. 154(b) by 86 days.

(21) Appl. No.: 16/106,706

(22) Filed: Aug. 21, 2018

(65) Prior Publication Data

US 2020/0062193 A1     Feb. 27, 2020

(51) Int. Cl.
    *B60R 11/06*     (2006.01)
    *B60R 9/00*     (2006.01)
    *B60R 11/00*     (2006.01)

(52) U.S. Cl.
    CPC .............. *B60R 11/06* (2013.01); *B60R 9/00* (2013.01); *B60R 2011/004* (2013.01); *B60R 2011/0085* (2013.01)

(58) Field of Classification Search
    CPC ... B60R 11/06; B60R 9/00; B60R 2011/0085; B60R 2011/004
    See application file for complete search history.

(56) References Cited

U.S. PATENT DOCUMENTS

2003/0189353 A1*   10/2003   Moore ................... B60R 11/06
                                                                      296/37.6

\* cited by examiner

*Primary Examiner* — D Glenn Dayoan
*Assistant Examiner* — Melissa Ann Bonifazi
(74) *Attorney, Agent, or Firm* — Dossey & Jones PLLC; Phillip Black

(57) ABSTRACT

A truck bed compartment and the method for using the compartment are provided. The truck bed compartment can include a crossbar disposed between two hinge platforms. A box disposed between and rotationally connected to the hinge platforms. The box can be lowered into an open position and raised to a closed position. In the opened position, a user can store items in the box and easily maneuver the box to the closed position when the items are removed.

3 Claims, 9 Drawing Sheets

TRUCK BED CONTAINER

BACKGROUND

Field

This application relates to a compartment for a truck bed. More particularly, this application relates to a foldable compartment for a truck bed.

Description of the Related Art

For years people have carried and stored items in the bed of their pickup trucks. Many storage containers have been designed so that a user can keep selected items in the bed of the truck including the standard tool box mounted against the cab and the bed cover or bed shell cover capable of locking off a space created in the truck bed.

Some collapsible storage containers have also been created so that a user can create a space in which to lock-up personal items in the bed of the truck. Most developments in this area are focused on creating a container within the truck bed that can be locked so that the truck owner can store personal items in that container to prevent theft of personal belongings. Moreover, currently containers take up some or all of the truck bed and are rather permanent fixtures that limit a truck owner's use of his truck bed, or, at the very best, reduces the amount of usable space in the truck bed.

Few, if any, of these developed containers allow a user to quickly store items in the truck bed in a manner that allows the user to access the items quickly and without having to unlock a box and/or climb into the bed of the truck to retrieve the item. Therefore, a need exists for a storage compartment that is quickly accessible to the user, prevents items from moving around the truck bed during transportation, and does not prevent or limit the use of the truck bed space.

SUMMARY

One aspect of the disclosed device is to provide a compartment in which to store items in a truck bed during transportation. More particularly, the compartment provides a space in which the user can store items in the bed of a pickup truck during transportation without storing the items in the cab of the truck. The container can be disposed in the bed of the truck to abut the cab of the truck so that the user can access the items by simply reaching over the side rails of the truck bed. The container can be raised so that the user does not have to reach all the way to the floor of the truck bed to access the stored items. This is most beneficial to all persons who are unable to reach the floor of the truck bed without having to climb up on the truck. Those who will most benefit are elderly and short users.

Another aspect of the disclosed device is to provide a compartment so that items do not roll or slide around the truck bed during transportation. Moreover, the compartment can be foldable so that when the user does not need to store any items in the bed of the truck, the compartment can be folded up against the wall of the truck bed abutting the cab of the truck. This allows for more usable space in the truck bed for large items without having to remove the compartment from the bed of the truck.

Additional aspects of the invention include methods of making and using food carriers in accordance with the foregoing aspects. It should also be noted that the invention further encompasses the various possible combinations of the aspects and features disclosed herein.

DETAILED DESCRIPTION

A design and method for using a truck bed compartment is provided. In general, the truck bed compartment includes a square or rectangular box having an internal volume and an open side thereof. The truck bed compartment can be attached to a frame, wherein the truck bed compartment can be manipulated between an "open" position and a "collapsed" position. The frame can be mounted to one or more walls if a truck bed to secure the truck bed compartment into place. The truck bed compartment can be moved to the open position by grabbing a top or outer portion of the box and pulling it downward about an axis, shown to be established by a point of connection with the frame. Similarly, the truck bed compartment can be moved into the collapsed position by grabbing the box and pulling it upward about the same axis.

The truck bed compartment, also referred to below as "the compartment," is configured and designed to be mounted in the bed of the truck near the cab. In most embodiments, the compartment extends from one side of the truck bed to the other. As is the common location for a truck toolbox, this location is often optimal for a user to quickly stow items in the container and get into the cab of the truck for loading, and exiting the truck and accessing the items in the container for unloading. The compartment can include one or more mounting options to provide a user the ability to mount and secure the compartment to the side walls of the truck bed and/or the front wall of the truck bed, that being the wall abutting or closest to the cab of the truck.

Figure 1:
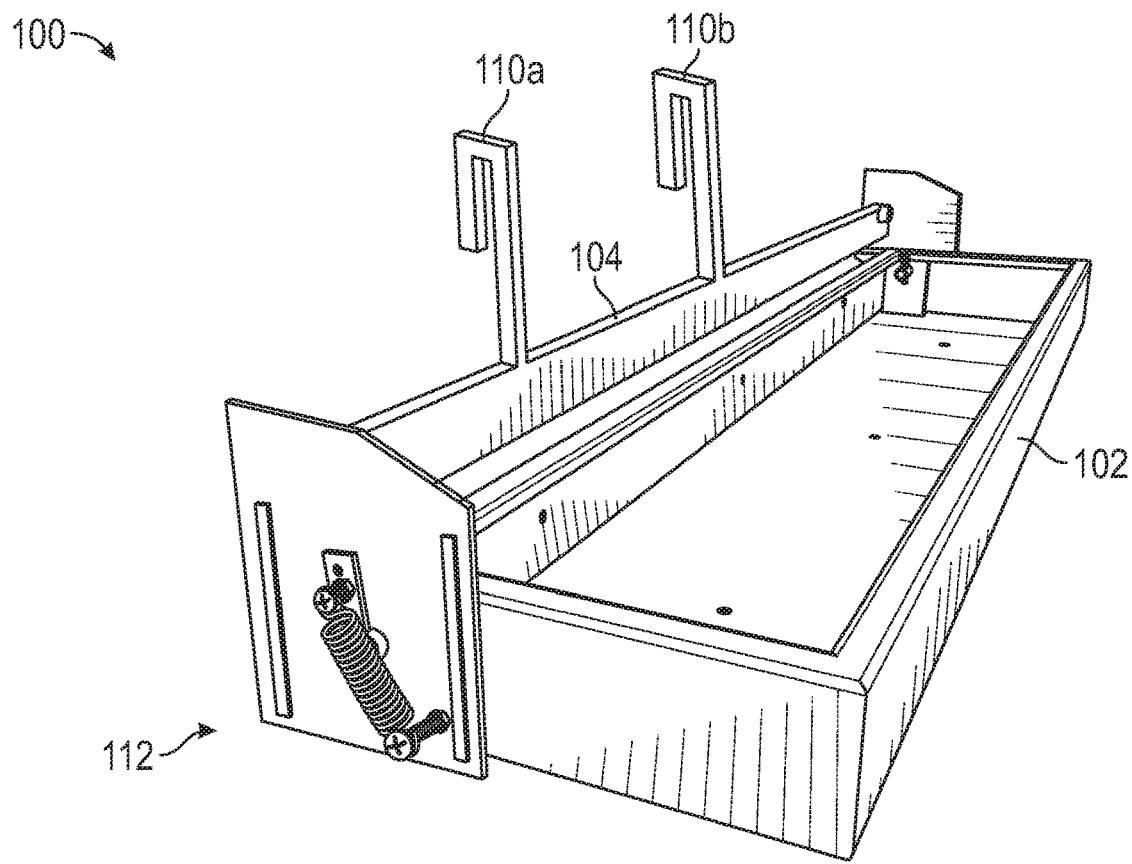
FIG. 1 depicts perspective view showing the front and side of a foldable compartment, as shown and described herein.

An embodiment of the disclosed compartment 100 is provided in FIG. 1. In FIG. 1, the perspective side view shows the compartment 100 in the open position. The compartment can include one or more of any one of a box 102, a crossbar 104, a hinge platform 112, a mounting hook 110a-b (two are shown), a spring mechanism 114, or any combination thereof. The box 102 can have an internal volume formed by side walls and solid bottom surface. The side walls can extend around the perimeter of the bottom surface and, optionally, one or more divider walls can be disposed across the internal volume to create one or more sub-compartments (not shown).

The container can be connected to a first hinge platform 112a about a first end and connected to a second hinge platform 112b about its second end. A crossbar 104 can extend from the first hinge platform 112a to the second hinge platform 112b to provide structural support and to provide a stop for when the container is moved to the collapsed position. The one or more mounting hooks 110a-b can be connected to or extend upward from the hinge platforms 112a-b and be configured to fit over and secure to the side rails of a pickup truck bed.

In an alternative embodiment (not shown), the mounting hooks 110a-b can instead be mounted to the crossbar 104 so that the mounting hooks 110a-b can be configured to fit over and secure to the front wall of the truck bed. In this alternative embodiment, the mounting hooks 110a-b can be positioned at any point along the crossbar to provide structural integrity and support to the compartment 100 as it is "hung" or secured to the front wall of the truck bed. For a first example, one mounting hook can be positioned in the center of the crossbar 104. For a second example, a first mounting hook can be disposed about the first end of the crossbar 104 and a second mounting hook can be disposed about the second end of the crossbar 104.

Figure 2:
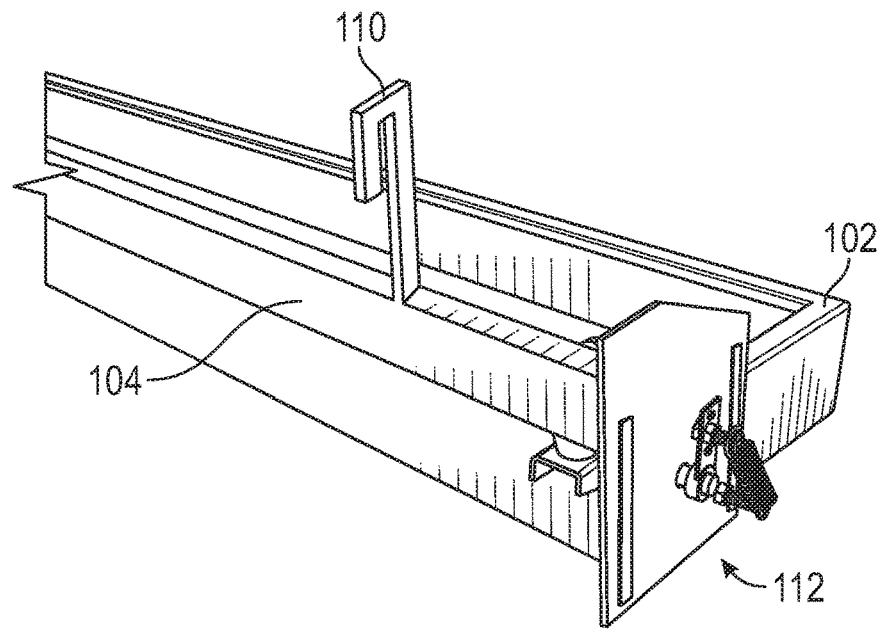
FIG. 2 depicts a perspective view showing the back side of the foldable compartment, as shown and described herein.
Figure 3:
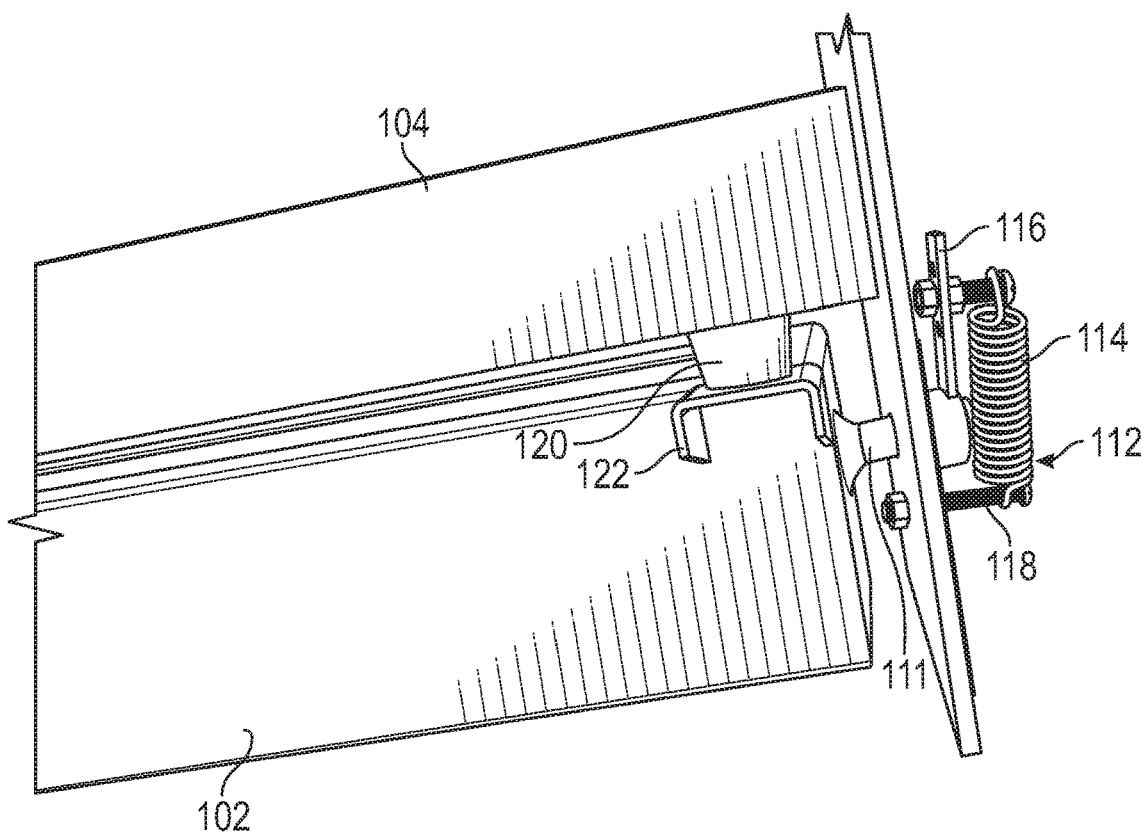
FIG. 3 depicts a close-up perspective view of the spring-loaded mechanism of the foldable compartment, as shown and described herein.
Figure 4:
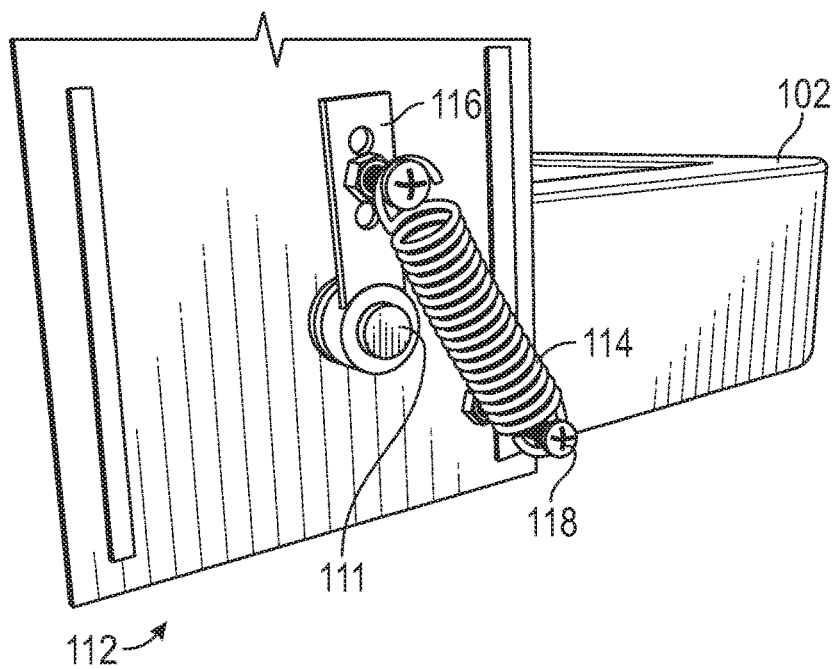
FIG. 4 depicts another close-up view of the spring-loaded mechanism of the foldable compartment, as shown and described herein.

FIGS. 2 and 3 depict a close up back side view of the hinge platform 112 and FIG. 4 depicts a close-up side view of the hinge platform 112. In most embodiments, a hinge platform 112 is positioned at each end of the compartment 100. The hinge platform 112 serves the purpose of connecting the compartment to a frame so that the compartment can rotate (or swivel) in relation to the fixed position of the frame. As shown, the frame components can include the hinge platform 112, the crossbar 104, and/or the mounting hooks 110.

An axis rod 111 can be connected to a back portion of the box 102, extending therefrom and through the wall of the hinge platform 112. As the axis rod 111 most often permanently fixed to the box 102, so the axis rod 111 is most often extended through the wall of the hinge plate in a way as to allow the axis rod 111 to rotate in relation to the wall of the hinge platform 112. In some embodiments, a barring can be seated in the wall and used to facilitate the rotation of the axis rod 111 relative to the hinge platform 112. A swivel flange 116 is attached to the distal end of the axis rod 111 and extend therefrom at a predetermined length. The swivel flange 116 can include a bolt and associated nut attached to the end thereof and configured to attach the swivel flange 116 to a first end of the spring 114. The second end of the spring 114 can be attached to a stationary bolt 118. In most embodiments, the stationary bolt is permanently attached to the wall of the hinge platform 112 at a position adjacent to the position at which the axis rod 111 traverses the wall of the hinge platform 112.

The purpose of the hinge platform, its components, and the position of those components is to provide a spring-loaded action for the box 102. The spring mechanism 114 is positioned to provide a force on the box 102 toward the collapsed position. So, as the box 102 is moved from the collapsed to open position, the spring mechanism causes a resistance so that the box 102 does not "slam" into the open position. As the box 102 is moved from the open position to the closed position, the spring 114 provides an assistance to the user to move into the collapsed position. This is most helpful when the box is heavy and/or made of heavy metal material. This is also beneficial because it helps to keep the box 102 in the collapsed position while the truck is in motion. The spring 114 should not provide so great a force that the box 102 cannot remain in the open position when empty.

As shown in FIG. 4, a favorable configuration is for the swivel flange 116 to extend upward from the axis rod 111. The first end of the spring 114 can be attached to the swivel flange 116 via a bolt extending outwardly from the swivel flange 116. The second end of the spring 114 can be attached to the stationary bolt 118. The stationary bolt 118 can be disposed in the wall of the hinge platform 112 at a position to the right of and slightly below the position of the axis rod 11l. As the box 102 is transitioned from the open position to the collapsed, the linear position of the spring 114 is transitioned from above the axis rod 111 to below the axis rod 111. The spring 114 position is then reversed when moved from the collapsed position to the open position.

The spring's 114 position with respect to the axis pin 111 is beneficial to the user because it manipulates that spring's 114 tension to aid the user in moving the weight of the box 102 into the next selected (open or collapsed) position. For example, in moving the box from the open position to the closed position, the user may not be able to lift up enough on the box 102 to collapse it because the box 102 is too heavy. But as disclosed herein, once the user initiates lifting, the spring 114 is transitioned to a linear position above the axis bolt 111 and the force of the spring 114 now acts to assist the user in lifting the box 102 to the collapsed position. Similarly, once the user initiates lowering (or opening) of the box 102, the spring 114 is transitioned to a linear position below the axis bolt 111 and the force of the spring 114 now acts to assist the user is lowering the box 102 to the open position. The stopper flange(s) 122 engage the stopper(s) 120 will engage each other once the open position is reach, thereby overcoming the force of the spring 114 and stopping the box 102 from opening any further.

In an alternative embodiment, the spring mechanism can instead include one or more gas springs used in place of the disclosed spring 114. The gas spring can be positioned on an outside surface of the hinge platform 112 as spring 114 is shown, but could also be mounted in an inside surface of the hinge platform 112 and directly connected to a portion of the box 102. The gas spring could be used to maintain the box in the opened or closed position, having the weight of the box and its contents providing opposing force to the gas spring.

Figure 5:
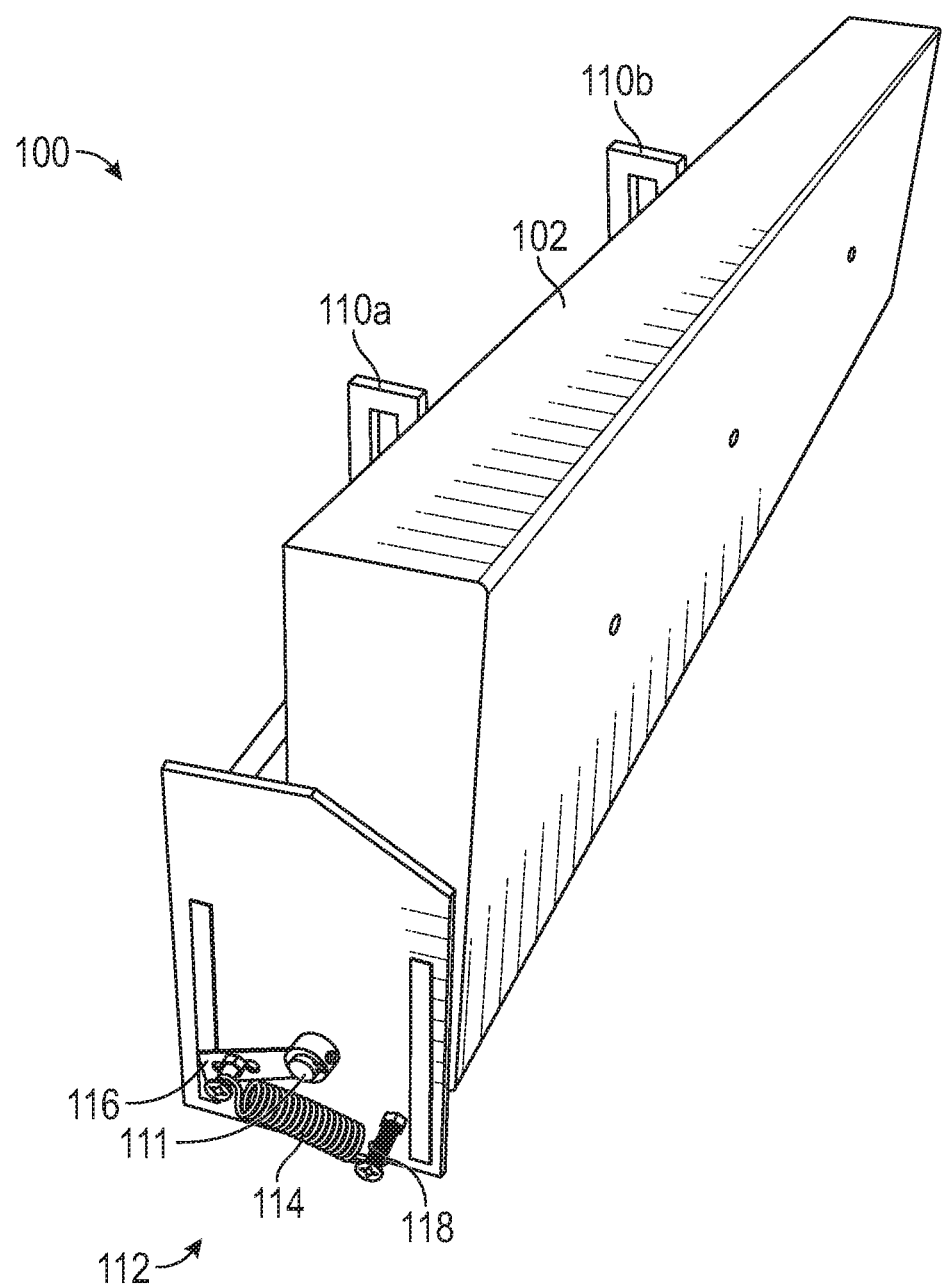
FIG. 5 depicts a front-side perspective view of the foldable compartment in the collapsed position, as shown and described herein.
Figure 6:
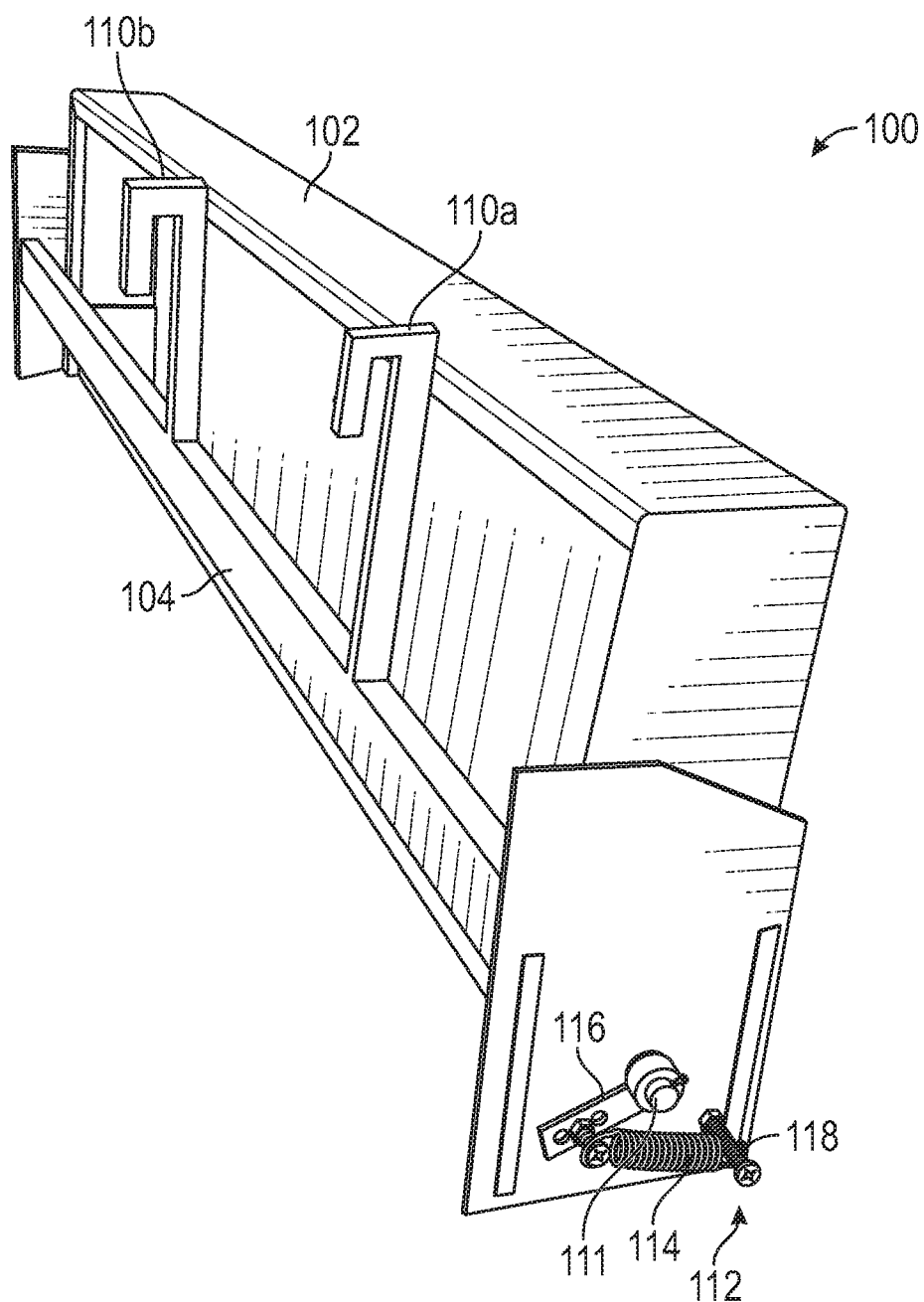
FIG. 6 depicts a back-side perspective view of the foldable compartment in the collapsed position, as shown and described herein.
Figure 7:
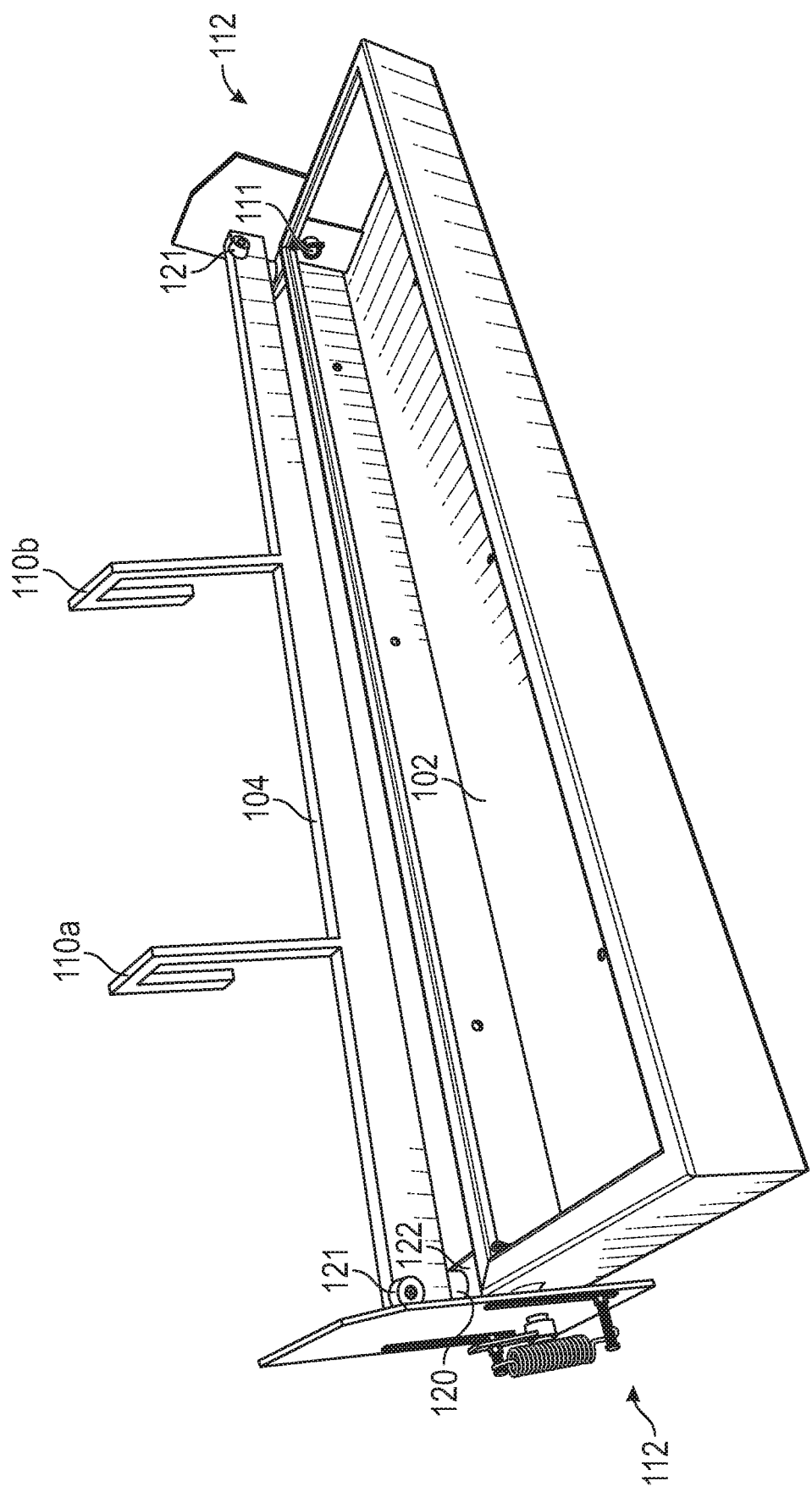
FIG. 7 depicts a front-side perspective view of the foldable compartment in the open position, as shown and described herein.

FIG. 5 depicts a front-side perspective view of the compartment 100 in the collapsed position, and FIG. 6 depicts a back-side perspective view of the foldable compartment 100 in the collapsed position. The box 102 can be held in the collapsed position by the force of the spring(s) 114 so that, when the truck is being driven, the box 102 does not bounce open or otherwise move between the open and collapsed position. As shown in FIGS. 1 and 7, one or more stoppers 121 can be mounted to the crossbar 104 and positioned so that when the box 102 is in the closed position, the top of the side wall of the box 102 contacts the stopper(s) 121. FIG. 7 depicts another front-side perspective view of the foldable compartment in the open position. In most embodiments, the stoppers 120, 121 described herein are made of rubber or soft plastic to absorb shock and prevent rattling if the collapsible compartment 100.

In the open position, the box 102 is in a generally horizontal position, parallel to the floor of the truck bed. More particularly, the bottom surface of the box 102 is parallel to the truck bed and the side walls of the box 102 are perpendicular, or about perpendicular, thereto. As such, one or more items can be placed into the internal volume of the open box 102 with the least chance of falling out. Accordingly, the term "open" as used herein to describe the position if the box 102 in reference to the frame means that the bottom surface of the box 102 is parallel to the truck bed (See FIG. 1). The term "collapsed" or "closed" as used herein to describe the position of the box 102 in reference to the frame mean that the bottom surface of the box 102 is perpendicular to the truck bed (See FIGS. 5 and 6).

As shown in FIGS. 2 and 3, a stopper 120 can be mounted to the crossbar 104 and positioned to engage a stopper flange 122 mounted to the box 102. More particularly, the stopper flange 122 can be mounted to and/or extend from the top of the rear side wall of the box and positioned to engage or stop the box from downward movement as the box is moved to the opened position. Without the stopper 120 and stopper flange 122, the box might continue its rotation beyond the box's 102 preferred horizontal position. As a person of skill in the art would understand, the stopper 120 and stopper flange 122 may be positioned at any point along the crossbar 104 and box, respectively, so long as they are aligned with one another and stop the box 102 from opening past the generally horizontal open position.

In most embodiments, and as shown here, the collapsible compartment 100 can be generally symmetrical. That is, a horizontal rotational axis can be established by an axis rod 111 extending from both the first and second ends of the box 102. A hinge platform 112 and any/all of its components (116, 114, 118, etc.) can be affixed to each axis rod 111 and one or more crossbars 104 can be connect the first hinge platform 112 to the other. In an alternative embodiment, the hinge platforms can be mounted directly to the internal walls of the truck bed, and a crossbar may not be needed.

Figure 8:
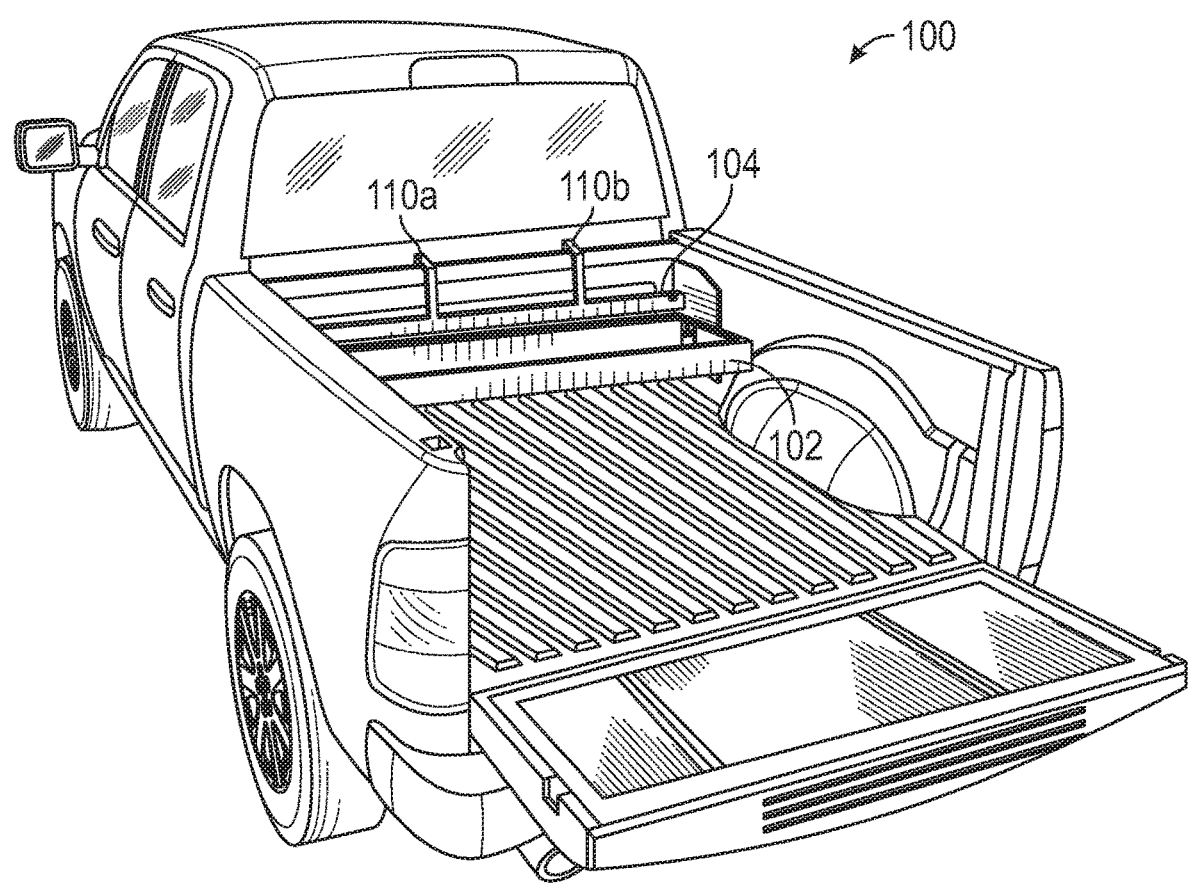
FIG. 8 depicts a perspective view of the foldable compartment disposed in the bed of a pick-up truck in the open position, as shown and described herein.
Figure 9:
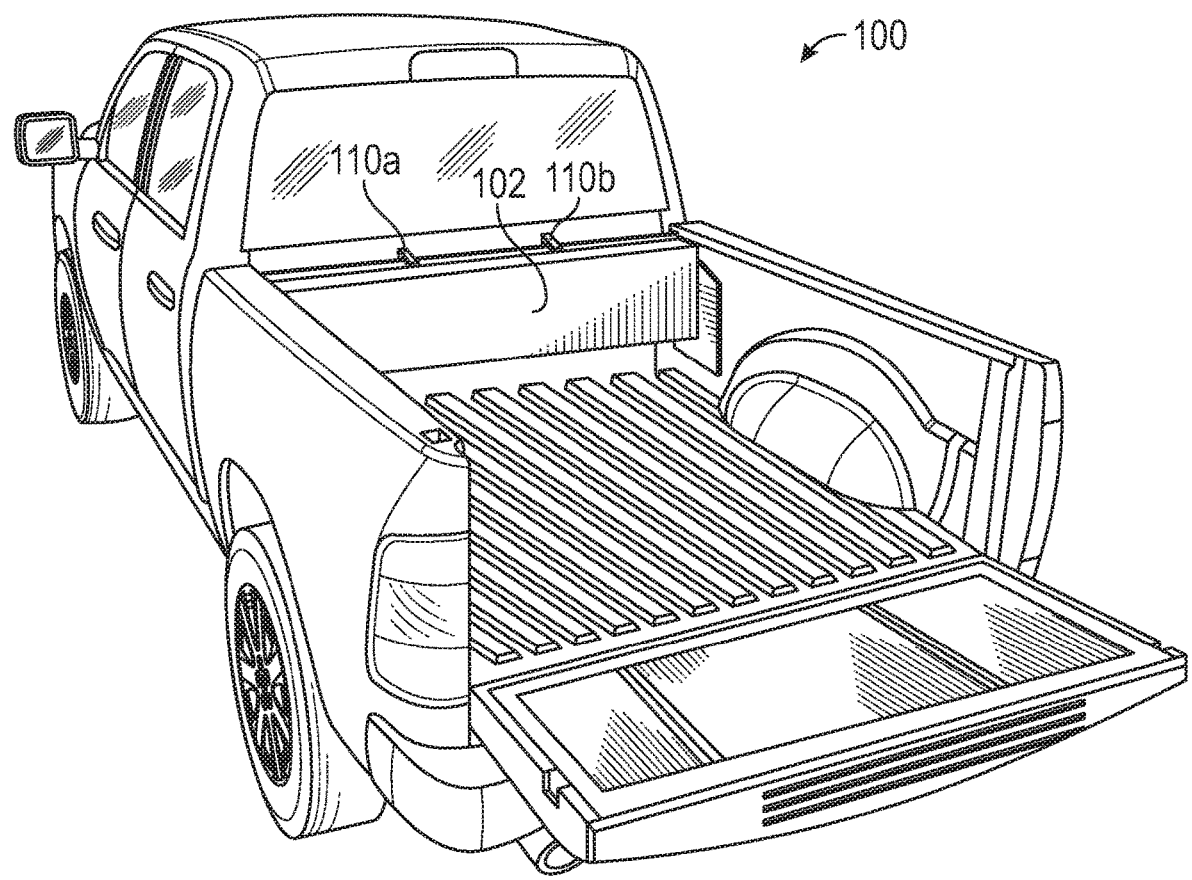
FIG. 9 depicts a perspective view of the foldable compartment disposed in the bed of a pick-up truck in the collapsed position, as shown and described herein.

As shown in FIGS. 8 and 9, the mounting hooks 110 can extend upward from the hinge platforms 112 and affix the collapsible compartment to side walls of the truck bed. In an alternative embodiment, and as previously mentioned, the mounting hooks can instead extend upward from the crossbar at a position (or positions) between the first and second ends of the crossbar 104. The mounting hooks 110 play an important part of keeping the collapsible compartment 100 level and secured to the truck bed so that the collapsible compartment 100 and the items disposed in the box 102 thereof do not shift during transit.

The collapsible compartment 100 can be installed in the vehicle at the time of manufacturing the vehicle or can be included as an "aftermarket" accessory to the vehicle. If included during the manufacturing process, the compartment 100 can be included in the truck bed and attached thereto by a variety of means, such as welding, bolting, or other more permanent means of connection to the truck bed. In such an embodiment, the compartment 110 may not require the mounting hooks 110.

An aftermarket embodiment can include one or more attachment means to the truck bed. For example, instead of the mounting hooks, the cross bar 104 and or a portion of one or more of the hinge platforms 112 can be welded or otherwise connected to the surface of the truck bed, including the truck bed side walls.

Figure 10:
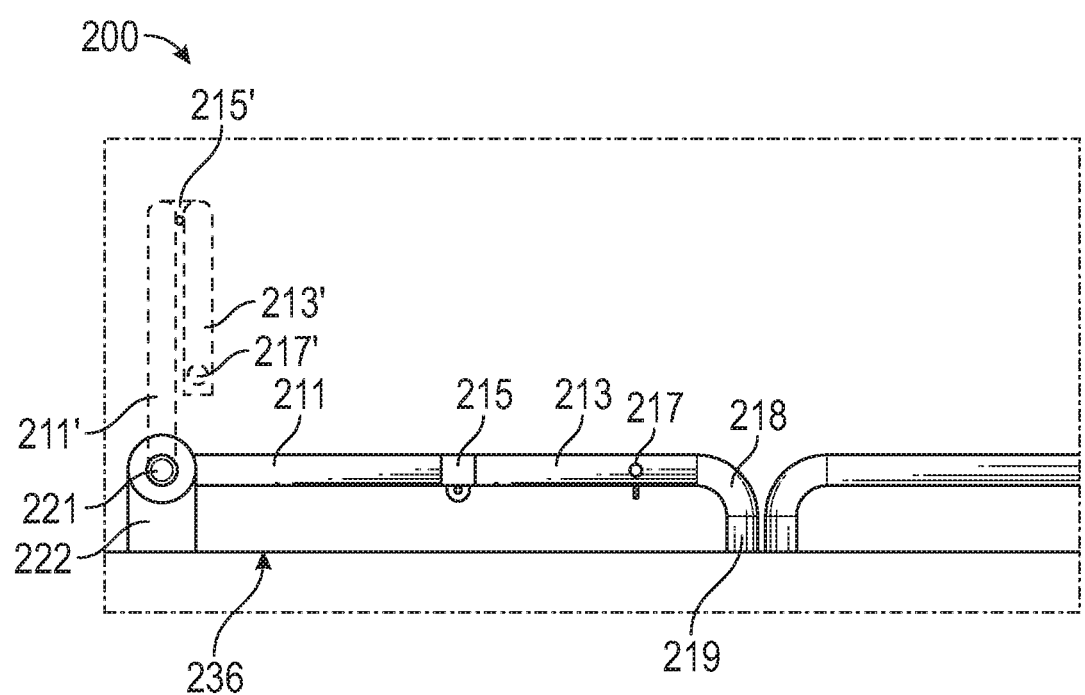
FIG. 10 depicts a perspective view of a collapsible retaining arm, as shown and described herein.
Figure 11:
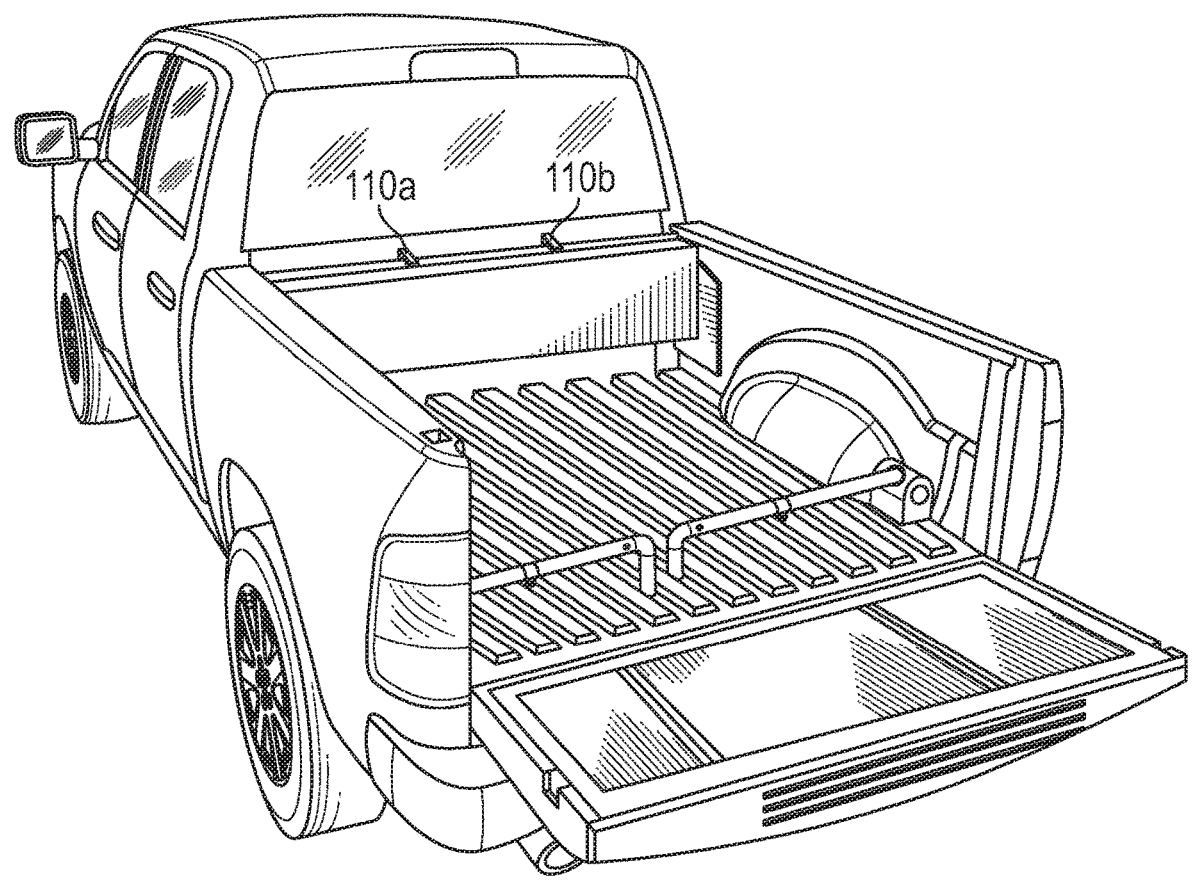
FIG. 11 depicts the collapsible retaining arm used in the bed of a pickup truck, as shown and described herein.

FIG. 10 depicts a collapsible retaining arm 200. The collapsible arm 200 can include one or more lengths 211, 213 (two are shown), a mounted hinge 222, a connection hinge 215, an arm bend 218, and a leg 219. FIG. 10 depicts the collapsible arm 200 in the "open" position in solid lines and in the "collapsed" in position broken lines. In the open position, the collapsible arm 200 can be extended partially or fully across the width of a truck bed and used to secure items in a predetermined zone. As shown in FIG. 11, the predetermined zone can include a portion of the floor of the truck bed near the rear.

The mounting hinge 222 can be mounted or otherwise connected to either the interior sidewall or the floor of the truck bed. The mounting hinge can include a pivot joint 221 having the first length 211 extending therefrom. The pivot joint 221 is configured to allow the first length 211 to be moved up or down about an axis (generally a horizontal axis). In at least one embodiment, mounting hinge can include one or two snap locks to "lock" the first length 211 in a first, or "up," position and a second, or "down," position.

Though not shown, an alternative embodiment may include a first length extending first along the horizontal plane and toward the truck cab, then bending about 90 degrees. This embodiment creates more room between the truck tailgate and the collapsible arm 200 when the collapsible arm is in the down position.

In the open position, the two or more lengths 211, 213 configured to stretch across at least a portion of the width of a truck bed and retain items in the truck bed between the collapsible arm(s) and the tailgate of the truck. In the closed position, the collapsible arm 200 can fold up and fit flush along the internal surface of the side wall of the truck bed.

A connection hinge 215 can link or connect the first length 211 to the second length 213. The connection hinge 215 can provide the means to fold, and unfold, the collapsible arm 200 about a pivotal axis so that the collapsible arm can be moved into the stored and open positions. As shown in the broken lines, the first length 211 can be positioned in a vertical orientation and the second length 213 can be aligned parallel so that the collapsible arm is secured in the first position.

The collapsible arm 200 can also include an arm bend 218 having a leg 219 extending therefrom. The arm bend 218 can facilitate a 90 degree turn in the collapsible arm, to where the leg 219 can extend downward and rest on the floor of the truck bed 230. For the benefit of structural integrity, a locking pin 217 can be used to lock the arm bed 218 into a position relative to the second length 213. As such, a tubular portion of the arm bend 218 can be disposed within a portion of the second length 213 such that the arm bend 218 can swivel or rotate in ration to the second length. One or more holes can be disposed through these overlapping portions at desired locations such that, when the arm bed 218 is made to be at a preferred position, the locking pin 217 can be disposed through the holes, locking the arm bend 218 into that position. When the collapsible arm is moved into the collapsed position, the locking pin 217 can optionally be removed an the arm bend can be rotated to another preferred position. For example, the arm bend 218 can be rotated 90 degrees so that the leg 219 is flush, or parallel to the side wall of the truck bed. Similarly, an optional embodiment can include a pivot section about the locking pin 217 so that a user can more easily manipulate the leg 219 into the down position when the collapsible arm 200 is in the down position and can more easily manipulate the leg 219 into the closed position with the collapsible arm 200 is moved into the up position.

FIG. 11 depicts the collapsible retaining arm used in the bed of a pickup truck. As shown in FIG. 11, a first collapsible arm can be mounted to the left side of the truck bed and a second collapsible arm can be mounted to the right side of the truck bed. The two collapsible arms can be aligned so that when they are both extended they meet in the middle of the truck bed. In this embodiment, a clamp, hook, or other connection means can be used to connect the distal ends of each collapsible arms together, forming a barrier across the entire width of the truck bed.

Various terms have been defined above. To the extent a term used in a claim is not defined above, it should be given the broadest definition persons in the pertinent art have given that term as reflected in at least one printed publication or issued patent.

While the foregoing is directed to embodiments of the present invention, other and further embodiments of the invention may be devised without departing from the basic scope thereof, and the scope thereof is determined by the claims that follow. Moreover, an ordinary person having skill in the art should understand that this truck bed compartment and its components can be manipulated and reconfigured to accomplish the same goal of having an adjustable lift plate.

What is claimed is:

1. A truck bed compartment, comprising:
a crossbar connecting a first hinge platform to a second hinge platform;
a box having an internal volume; and
a first axis rod extending from a first end of the box and a second axis rod extending from a second end of the box, where the first and second axis rods rotationally connect the box to the first and second hinge platforms, wherein a swivel flange extends from the distal end of the first axis rod, wherein a spring connects the swivel flange to a stationary bolt disposed on the mounting platform, and wherein the spring provides tension for movement of the box between an opened position and a closed position.

2. A truck bed compartment, comprising:
a crossbar connecting a first hinge platform to a second hinge platform;
a box having an internal volume; and
a first axis rod extending from a first end of the box and a second axis rod extending from a second end of the box,
where the first and second axis rods rotationally connect the box to the first and second hinge platforms,
wherein a swivel flange extends from the distal end of the first axis rod, wherein a spring connects the swivel flange to a stationary bolt disposed on the mounting platform, and
wherein the spring provides tension for movement of the box between an opened position and a closed position.

3. The truck bed compartment of claim 2, further comprising one or more mounting hooks extending from the truck bed compartment and configured to engage the sidewall of the truck bed.

* * * * *